Feb. 9, 1937. A. WINCKLER 2,069,987
FASTENING MEANS
Filed Aug. 8, 1933

Inventor:
Arnold Winckler

Patented Feb. 9, 1937

2,069,987

UNITED STATES PATENT OFFICE 2,069,987

FASTENING MEANS

Arnold Winckler, Essen, Germany, assignor to firm: Gutehoffnungshütte Oberhausen Aktiengesellschaft, Oberhausen-Rhineland, Germany Application August 8, 1933, Serial No. 684,151
In Germany July 7, 1932

1 Claim. (Cl. 85—2.4)

For fastening railroad rails to wooden ties, instead of the use of a coach screw to be screwed down directly into the tie and affording a doubtful grip, it already has been proposed to insert into the ties special bushes designed to receive the fastening screws. For this design each bush which on its outside is partially grooved, consists of two separate longitudinal halves. These halves are driven into a wooden tie provided with a corresponding hole, their lower ends being spread by a nut having a partial outside taper and previously placed into the hole. By the tightening of the rail fastening screw entering into the nut, the bush halves can be spread farther apart. For inserting the bush halves into the wooden tie, however, special tools are required. Moreover, their resistance against being pulled out of the tie is not sufficiently strong, and it is useless to replace a bush which has become unserviceable in the tie, by a new one, because the new bush would not grip any longer sufficiently in the tie.

My invention eliminates these drawbacks by the new feature that a dowel-like metal bush is slotted only for its essential length and is tapered inside, into which inside taper the nut for the rail fastening screw fits as closely as possible with its tapered circumferential surface. Under these conditions, the bush now can be provided with an outside wood-screw thread which renders it relatively easy to be inserted into the timber and also assures a fast grip of the bush in a hole bored into the tie. The same conditions will be preserved even when a bush which has become unserviceable for some reason or other, has to be replaced by a new one. The bush inserted into a tie protrudes with its head portion for such a length that this portion can fit into a corresponding bore hole of the tie-plate or can serve the purpose of giving lateral hold to the rail. So it does not matter for the fastening bush whether the rail is seated upon the wooden tie by means of a tie-plate or directly upon the wooden tie, nor does it matter what shape is given to the tie-plate with all the other rail fastening means. The rail seatings upon a tie as shown on the drawing therefore, are to be considered merely as examples.

Figure 2:
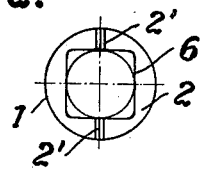
Figs. 2 and 3 are plan views of different shapes of bush heads.

The dowel-like bush is designated by the reference number 1. On its outside surface it is provided with a wood-screw thread 1' and, except in its head-like end 2, it has slots 3 over a substantial portion of its length. The inside surfaces 1" of the bush portions which, because of the slots 3, are laterally movable, are of hollow-cone shape and serve as guides for a cone-shaped nut 4 engaged by the thread of the screw-bolt 5. The conical nut 4 is prevented from being turned round by a fin 4' which, preferably enters only into one of the slots 3. The head 2 of the dowel 1 preferably has a polygonal opening 6 (Fig. 2) or outside shoulders 6' (Fig. 3) for the use of a wrench or spanner for screwing or unscrewing the dowels into or from the wooden tie.

Figure 1:
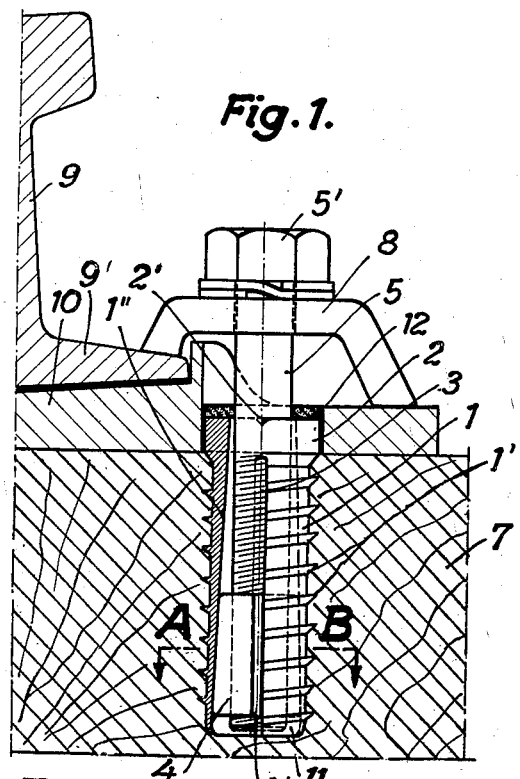
Fig. 1 shows in cross section a rail fastening with a bush inserted into the tie, the bush being shown partially in longitudinal section and partially in side view.
Figure 6:
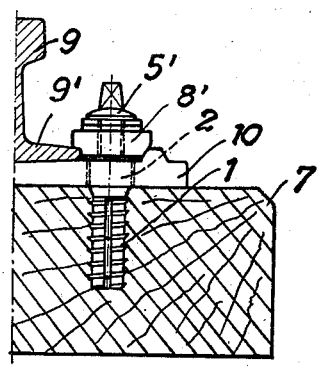
Figs. 5, 6 and 7 illustrate different ways and means for fastening rails.

When the screw bolt is tightened bearing with its head 5' against a clamp 8 (Figs. 1 and 5) or against a wedge-type clamp 8' (Fig. 6) immediately at the flange 9' of the rail 9 (Fig. 7), the conical nut 4 acting like a wedge is pulled upward against the surface of the hollow-cone 1" to such an extent as the wood of the tie will allow the laterally movable dowel portions to spread apart. As a further safeguard, the dowel bush 1 is prevented from being pulled out by its outside woodscrew thread 1'. When the screw bolt 5, 5' is loosened and the conical nut 4 is pushed down thereby the dowel bush 1 can be readily screwed out of the tie 7 by means of a wrench or spanner placed into or upon the head 2.

Figure 5:
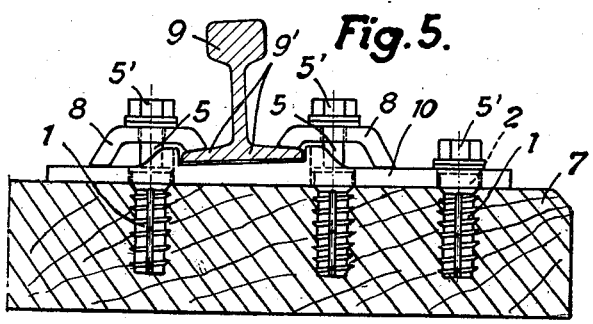
Figure 7:
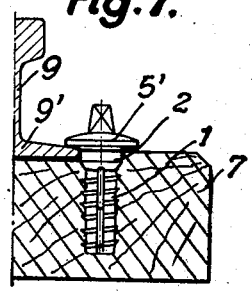

The screwing of the dowel bush 1 into the tie is preferably limited by the length of the wood-screw thread so that the bush head 2 protrudes above the tie 7 for such a length that it can fit into a corresponding hole of the tie-plate 10. This arrangement insures the tie-plate against lateral displacement without any stresses being exerted upon the fastening screw bolt 5. The railroad rails will be secured in the same manner when they are fastened to the ties without tie-plates, the rails then bearing immediately against the dowel head 2 (Fig. 7). When a tie-plate is used, provided it is of suitable design, it can be secured to the wooden tie 7 by additional dowels 1 as shown in Fig. 5. This way of fastening is also practicable at the opposite end of the tie plate, the rail 9 being connected in this case immediately with the tie-plate 10 in well-known manner, without the necessity of having recourse to the tie 7.

In order to keep the conical nut 4 assembled with the dowel bush 1, when they are not in use, the lower rim 11 of the dowel is bent inwards.

Moisture is prevented from penetrating into the dowel bush 1 by the putting thereupon of a suitable jointing material 12 or by the pouring into it of a hydrofuge mass.

Figure 3:
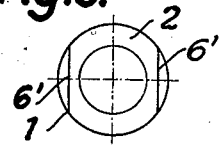
Figure 4:
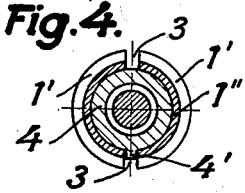
Fig. 4 is a cross-section along line A—B of Fig. 1.

After the dowel bush 1 has been screwed into the tie 7, care should be taken that the slots 3 are situated transversally to the longitudinal grain of the timber, in order to prevent the spreading effect of the laterally movable dowel portions from splitting the tie, as will occur when the slots in their relative position coincide with the longitudinal grain of the wood. In order to easily determine the respective position of the screwed-in dowel bush 1, according to Figs. 1 and 2 kerfs 2' are provided in the top of the head 2 corresponding to the position of the slots 3 or faces 6' are provided laterally at the head 2 of the dowel bush as shown in Fig. 3.

The dowel bush of the design as described also may be used for any other rails to be fastened upon or to a wooden bedding or wooden support.

I claim:

In combination, a support having an aperture, an expansible sleeve in said aperture, a nut within said sleeve operable by outward movement relative thereto to expand the same, a member bearing against said support, said member having an aperture, the outer end portion of said sleeve extending into and fitting the aperture in said member whereby the latter is held against shifting laterally relative to said support, a bolt extending through the outer end portion of said sleeve into the latter and into threaded engagement with said nut and cooperating with said nut and said member to expand the sleeve and fasten the member against said support, the outer face of said sleeve being disposed inwardly of the outer face of said member to provide a pocket, and waterproof material disposed in said pocket around said bolt to exclude moisture from the interior of said sleeve.

ARNOLD WINCKLER.